(12) United States Patent
Jiang et al.

(10) Patent No.: US 10,320,729 B2
(45) Date of Patent: Jun. 11, 2019

(54) METHOD, APPARATUS, AND SYSTEM FOR SHIELDING HARASSMENT BY MENTION IN USER GENERATED CONTENT

(71) Applicant: Tencent Technology (Shenzhen) Co., Ltd., Shenzhen, Guangdong (CN)

(72) Inventors: Xingcai Jiang, Guangdong (CN); Lihua Huang, Guangdong (CN); Ming Tian, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 251 days.

(21) Appl. No.: 14/750,663

(22) Filed: Jun. 25, 2015

(65) Prior Publication Data

US 2015/0295870 A1  Oct. 15, 2015

Related U.S. Application Data

(63) Continuation of application No. PCT/CN2013/089931, filed on Dec. 19, 2013.

(30) Foreign Application Priority Data

Dec. 27, 2012  (CN) .......................... 2012 1 0580020

(51) Int. Cl.
*G06F 15/16* (2006.01)
*H04L 12/58* (2006.01)
(Continued)

(52) U.S. Cl.
CPC ............ *H04L 51/12* (2013.01); *G06F 16/958* (2019.01); *G06F 16/9566* (2019.01);
(Continued)

(58) Field of Classification Search
CPC ....... H04L 51/12; H04L 51/32; H04L 65/403; H04L 65/4037; G06F 17/2705;
(Continued)

(56) References Cited

U.S. PATENT DOCUMENTS 6,829,635 B1 * 12/2004 Townshend ............. H04L 51/14
709/206
2003/0135379 A1 * 7/2003 Schirmer .......... G06F 17/30616
705/344
(Continued)

FOREIGN PATENT DOCUMENTS

CN  102111723 A  6/2011
CN  202003351 U  10/2011
(Continued)

OTHER PUBLICATIONS

International Search Report dated Feb. 27, 2014 for corresponding International Application No. PCT/CN2013/089931, 5 pages.

*Primary Examiner* — Phuoc H Nguyen
(74) *Attorney, Agent, or Firm* — Brinks Gilson & Lione

(57) ABSTRACT

A method, an apparatus, and a system for shielding harassment by a mention in user generated content (UGC) are provided. The method includes: receiving a UGC publication request; parsing the UGC publication request to determine whether a mentioned object is included; determining whether the UGC publication request meets a preset harassment determining condition if it is determined that the mentioned object is included; and forbidding sending message content of the UGC publication request to the mentioned object if the preset harassment determining condition is met. A defect of processing after occurrence of harassment by a mention is overcome, beforehand processing for the harassment by a mention in UGC is implemented, and the efficiency of processing the harassment by a mention in UGC is improved; moreover, automatic shielding of the
(Continued)

harassment by a mention in UGC is implemented, and a defect of manual examination is overcome.

15 Claims, 3 Drawing Sheets

(51) Int. Cl.
    *G06F 16/955*     (2019.01)
    *H04L 29/06*     (2006.01)
    *G06F 16/958*     (2019.01)
    *G06Q 50/00*     (2012.01)

(52) U.S. Cl.
    CPC ............ *H04L 51/32* (2013.01); *H04L 65/403* (2013.01); *G06Q 50/01* (2013.01)

(58) Field of Classification Search
    CPC ............. G06F 17/3088; G06F 16/9566; G06F 16/958; C07D 281/16; C07D 417/12; G06Q 50/01
    USPC ........................................................ 709/206
    See application file for complete search history.

(56) References Cited

U.S. PATENT DOCUMENTS

| | | | | |
|---|---|---|---|---|
| 2007/0266023 | A1* | 11/2007 | McAllister | G06F 17/27 |
| 2008/0168495 | A1* | 7/2008 | Roberts | H04L 12/4625 |
| | | | | 725/39 |
| 2011/0106784 | A1* | 5/2011 | Terheggen | G06F 17/3005 |
| | | | | 707/706 |
| 2012/0131438 | A1* | 5/2012 | Li | G06F 21/604 |
| | | | | 715/234 |

FOREIGN PATENT DOCUMENTS

| | | |
|---|---|---|
| CN | 102419777 A | 4/2012 |
| CN | 102591983 A | 7/2012 |
| CN | 102694673 A | 9/2012 |
| CN | 202503667 U | 10/2012 |

* cited by examiner

METHOD, APPARATUS, AND SYSTEM FOR SHIELDING HARASSMENT BY MENTION IN USER GENERATED CONTENT

RELATED APPLICATION

This application is a continuation application of International Application No. PCT/CN2013/089931 filed on Dec. 19, 2013 and entitled "USER-GENERATED CONTENT MENTIONED HARASSMENT SHIELDING METHOD, DEVICE AND SYSTEM", which claims priority to Chinese Patent Application No. 2012105800201, filed with State Intellectual Property Office of the PRC on Dec. 27, 2012 and entitled "METHOD, APPARATUS, AND SYSTEM FOR SHIELDING HARASSMENT BY MENTION IN USER GENERATED CONTENT", which are incorporated herein by reference in their entireties.

FIELD OF THE TECHNOLOGY

Implementation manners of the present disclosure relate to the field of Internet application technologies, and more specifically, to a method, an apparatus, and a system for shielding harassment by a mention in a user generated content (UGC).

BACKGROUND OF THE DISCLOSURE

With the rapid development of the computer technology and the network technology, the Internet is playing a more and more important role in daily life, study, and work of people. A variety of applications on the Internet emerge one after another.

User generated content (UGC) is a new manner for a user to use the Internet, with which a conventional case where downloading predominates is changed to a case where downloading and uploading are of equal importance. Social networks, video sharing, microblog, and blog all are main application forms of the UGC. With the continuous development of global Internet services, a UGC service is increasingly rising, and attracts extensive attention from the industry.

Microblog is a typical UGC application, and is a user relationship based platform for sharing, disseminating, and acquiring information. A user can publish information about personal thoughts and doings in brief words (generally less than 140 words) on microblog by using various terminals, implementing instant sharing of the information. Microblog is a new manner in which a user shares and disseminates information on the Internet. Due to the characteristic of a weak relationship chain of microblog, a message on microblog is transferred very quickly, which induces many users to publish on microblog some messages adverse to the ecological development of microblog, for example, attaching their own advertisements when reposting and commenting on a message of an eminent person. Such reposts and comments that are irrelevant to a mentioned user all enter an inbox of the mentioned user, causing enormous harassment to the user, lowering the message quality of microblog and the creative enthusiasm of users, and bringing a tremendous side effect to the positive development of the microblog.

In the existing technology, a policy of processing after occurrence is adopted for a harassing mention behavior in a UGC service, that is, only when a user reports a malicious mention by an account does an examiner determine whether the account causes harassment to another user. If the harassment is confirmed, the examiner performs publication banning or account suspending on the harassing account according to the severity of the harassment.

However, for massive UGC data, the efficiency of manually examining and processing a harassing mention behavior is low. Moreover, this manner of processing after occurrence relies on feedback of a user, and actually many users do not know how to or are unwilling to make a feedback. Therefore, the harassing behavior is often not processed in time, further reducing the efficiency of processing harassment by a mention in UGC.

SUMMARY

Embodiments of the present disclosure provide a method for shielding harassment by a mention in UGC, to improve the efficiency of processing harassment by the mention in UGC.

Embodiments of the present disclosure provide an apparatus for shielding harassment by a mention in UGC, to improve the efficiency of processing harassment by the mention in UGC.

Embodiments of the present disclosure provide a system for shielding harassment by a mention in UGC, to improve the efficiency of processing harassment by the mention in UGC.

Technical solutions of the embodiments of the present disclosure are as follows:

A method for shielding harassment by a mention in UGC is provided, which includes:

receiving a UGC publication request; and parsing the UGC publication request to determine whether a mentioned object is included, determining whether the UGC publication request meets a preset harassment determining condition if it is determined that the mentioned object is included, and forbidding sending a message content of the UGC publication request to the mentioned object if the preset harassment determining condition is met.

An apparatus for shielding harassment by a mention in UGC is provided, which includes a UGC publication request receiving unit, a UGC parsing unit, and a harassment processing unit.

The UGC publication request receiving unit is used to receive a UGC publication request.

The UGC parsing unit is used to parse the UGC publication request, to determine whether a mentioned object is included.

The harassment processing unit is used to, determine whether the UGC publication request meets a preset harassment determining condition if the UGC parsing unit determines that the mentioned object is included, and forbid sending a message content of the UGC publication request to the mentioned object if the preset harassment determining condition is met.

A system for shielding harassment by a mention in UGC is provided, which includes a terminal and a server.

The terminal is used to generate a UGC and send a UGC publication request to the server.

The server is used to parse the UGC publication request to determine whether a mentioned object is included, determine whether the UGC publication request meets a preset harassment determining condition if it is determined that the mentioned object is included, and forbid sending a message content of the UGC publication request to the mentioned object if the preset harassment determining condition is met.

A storage medium is provided, which stores therein a computer program, where the computer program is used for executing the following processes:

receiving a UGC publication request; and parsing the UGC publication request to determine whether a mentioned object is included, determining whether the UGC publication request meets a preset harassment determining condition if it is determined that the mentioned object is included, and forbidding sending a message content of the UGC publication request to the mentioned object if the preset harassment determining condition is met.

BRIEF DESCRIPTION OF THE DRAWINGS

The following accompanying drawings are only for some examples of technical solutions of the present disclosure, and the present disclosure is not limited to features shown in the figures. In the following accompanying drawings, similar numerals indicate similar elements.

DESCRIPTION OF EMBODIMENTS

To make objectives, technical solutions and advantages of the present disclosure clearer, the present disclosure is detailed hereinafter in conjunction with accompanying drawings.

For the purpose of brief and intuitive description, solutions of the present disclosure are described by describing several representative embodiments. A large number of details in the embodiments are only used to help understand the solutions of the present disclosure. However, it is very obvious that the technical solutions of the present disclosure may be not limited to the details when being implemented. To avoid unnecessarily making the solutions of the present disclosure unclear, for some embodiments, details are not provided, and only frameworks are provided. In the following, "include . . . " refers to "include but not limited to", and "according to . . . " refers to "at least according to . . . , but not limited to only according to . . . ". Due to a language habit, in the following, when a quantity of a component is not specially given, it means that there may be one or more of that component, or it may be understood that there is at least one of that component.

Figure 1:
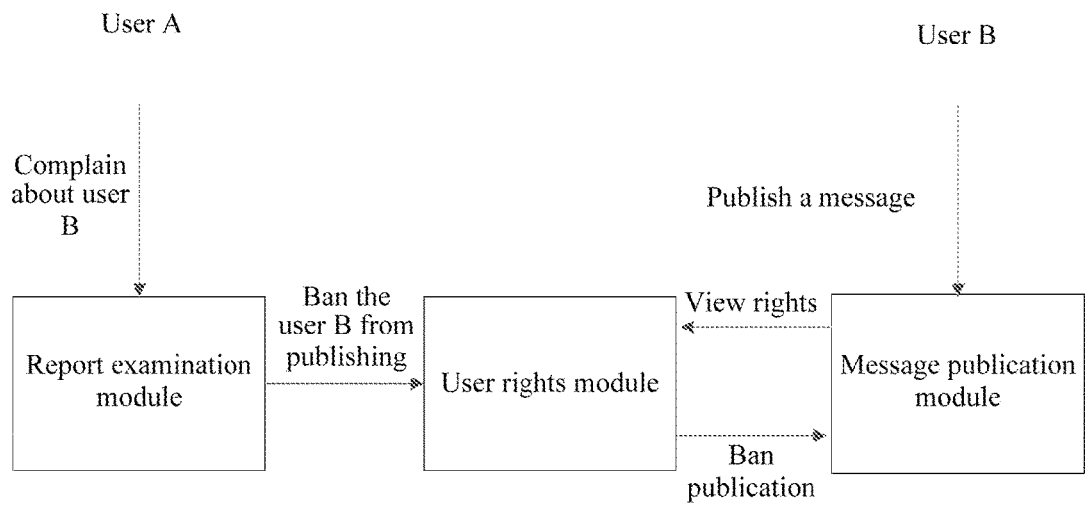
FIG. 1 is a schematic diagram of processing a harassing mention in the existing technology.

FIG. 1 is a schematic diagram of processing a harassing mention in the existing technology.

As shown in FIG. 1, when a user A reports a malicious mention by a user B, a report examination module determines whether the account B causes any harassment to the user A, and if the harassment is confirmed, the report examination module performs publication banning or account suspending on the account according to the severity of the harassment. However, this solution relies on feedback of the user, and many users do not know how to or are unwilling to make a feedback. Moreover, for the report examination module, the examination is done manually, having a low work efficiency. In addition, after being banned from publishing, an executor of the harassment (that is, the user B) may use another account to continue to perform a malicious mention operation, the harassed user still passively receives many harassing mentions. Moreover, a processing cycle of the existing technology is very long. Before the malicious user B is banned from publishing, the user A may have been harassed for a long time. Therefore, the effect is not obvious.

In embodiments of the present disclosure, an intelligent shielding policy for harassment by a mention in UGC is provided. In the embodiments of the present disclosure, multiple multidimensional message features and user features are synthesized, whether a message is harassing to a mentioned user can be determined correctly in real time, and then the message is actively shielded before the message enters an inbox of the mentioned user.

Figure 2:
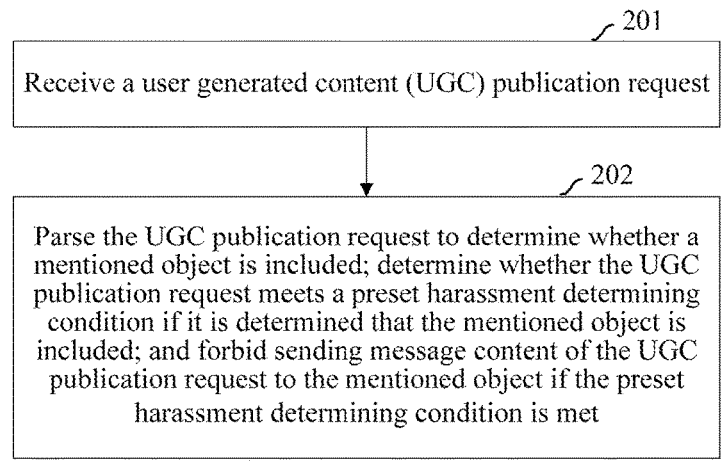
FIG. 2 is a flowchart of a method for shielding harassment by a mention in a UGC according to an embodiment of the present disclosure.

FIG. 2 is a flowchart of a method for shielding harassment by a mention in a UGC according to an embodiment of the present disclosure.

As shown in FIG. 2, the method includes steps 201 and 202.

In step 201, a UGC publication request is received.

Herein, a user that intends to publish a UGC sends the UGC publication request. In the embodiment of the present disclosure, the UGC publication request is received first.

The user may send various types of UGC publication requests in multiple manners. For example, the user may send the UGC publication request through a terminal such as a feature phone, a smart phone, a palmtop computer, a personal computer (PC), a tablet computer, or a personal digital assistant (PDA). Operating systems may be installed on these terminals, including but not limited to: a Windows operating system, a LINUX operating system, an Android operating system, a Symbian operating system, a Windows mobile operating system, an iOS operating system, and the like.

The foregoing lists specific types of terminals and specific types of operating systems in detail. However, a person skilled in the art may be aware that, the embodiment of the present disclosure is not limited to the listed types, and is further applicable to any other types of terminals and operating systems.

In addition, the UGC publication request specifically may include a request for publishing a UGC repost, a request for publishing a UGC comment, a request for publishing an original UGC, and the like.

In the embodiment of the present disclosure, the UGC publication request may specifically include, but is not limited to: a social network publication request, a video sharing publication request, a microblog publication request, a blog publication request, or the like.

In step 202, the UGC publication request is parsed to determine whether a mentioned object is included, whether the UGC publication request meets a preset harassment determining condition is determined if it is determined that the mentioned object is included, and a message content of the UGC publication request is forbidden from being sent to the mentioned object if the preset harassment determining condition is met.

Herein, the UGC publication request is first parsed to determine whether the mentioned object is included. For example, in the content of a microblog message body, sometimes an account name of a user closely follows a symbol "@", and the account name of the user is a mentioned object. Therefore, in the embodiment of the present disclosure, whether the mentioned object exists may be determined by determining whether the symbol "@" exists. If the UGC publication request is not shielded, specific content of the UGC publication request automatically enters an inbox of the mentioned object.

If it is determined that the mentioned object is included, whether the UGC publication request meets the preset harassment determining condition is further determined. If the preset harassment determining condition is met, the message content of the UGC publication request is forbidden from being sent to the mentioned object.

In the embodiment of the present disclosure, multiple multidimensional message features and user features may be synthesized, to determine correctly in real time whether a message constitutes a harassment to the mentioned object, and then the harassing message may be actively shielded before the harassing message enters the inbox of the mentioned object.

In an embodiment, the preset harassment determining condition may be: a harassment determining condition that is determined based on a message content feature. In this case, the message content feature of the UGC publication request is first parsed out, and then it is determined whether the message content feature of the UGC publication request meets the preset harassment determining condition.

For example, the harassment determining condition that is determined based on the message content feature may include at least one of the following: determining whether the message content of the UGC publication request includes a uniform resource locator (URL); determining whether the message content of the UGC publication request relates to a topic; determining whether the message content of the UGC publication request is a repost or a comment; determining whether the message content of the UGC publication request is original; determining whether the message content of the UGC publication request includes a preset blacklisted word; determining whether the message content of the UGC publication request is published in a third-party application; or the like.

Figure 3:
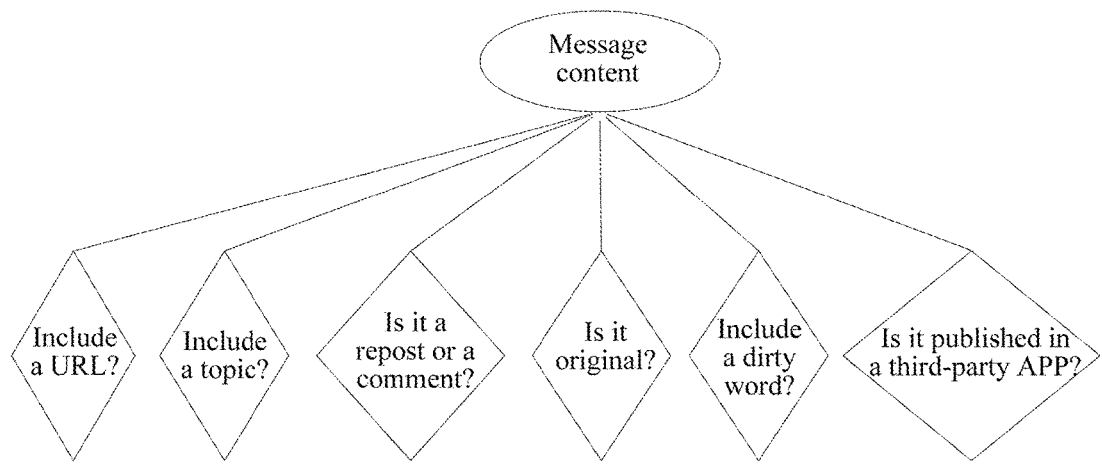
FIG. 3 is a schematic diagram of a message content assessment according to an embodiment of the present disclosure.

Various factors may be comprehensively determined with respect to multiple harassment determining conditions that are determined based on the message content feature. FIG. 3 is a schematic diagram of a message content assessment according to an embodiment of the present disclosure. For example, (a) if the message content of the UGC publication request includes a URL, it is considered that the UGC publication request may be harassing;

(b) if the UGC publication request is original (or includes a topic), and the message content of the UGC publication request includes a preset blacklisted word, it is considered that the UGC publication request may be harassing;

(c) if the message content of the UGC publication request includes a URL and the message content of the UGC publication request is published in a third-party application, it is considered that the UGC publication request is probably harassing;

(d) if the message content of the UGC publication request is a repost or a comment and the message content of the UGC publication request includes a preset blacklisted word, it is considered that the UGC publication request is probably harassing; or (e) if the message content of the UGC publication request includes a URL, the message content is published in a third-party application, the message content is a repost or a comment, and the message content of the UGC publication request includes a preset blacklisted word, it is considered that the UGC publication request is probably harassing.

Scores may be separately set for the foregoing multiple harassment determining conditions that are determined based on the message content feature, and then the scores for all the harassment determining conditions that are determined based on the message content feature may be added up to obtain a total score, and the total score may be compared with a threshold preset based on the message content feature, to determine whether a harassment is constituted. When the harassment is constituted, the message content of the UGC publication request is forbidden from being sent to the mentioned object. A harassment determining condition may be added or deleted, and preferably a score of each harassment determining condition is dynamically adjustable, which can adapt to an ever changing malicious mention harassment model.

The foregoing lists in detail specific examples of harassment determining conditions that are determined based on the message content feature, and exemplary descriptions about integrally and comprehensively determining, based on multiple harassment determining conditions that are determined based on the message content feature, whether the harassment is constituted. A person skilled in the art may be aware that, these examples and exemplary descriptions are only expository, and are not used to limit the embodiment of the present disclosure.

Figure 4:
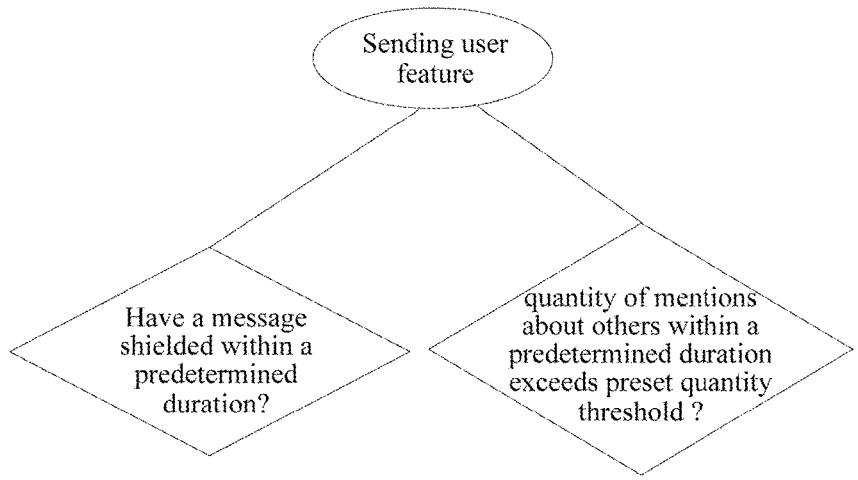
FIG. 4 is a schematic diagram of a sending user feature assessment according to an embodiment of the present disclosure.

FIG. 4 is a schematic diagram of assessing a sending user feature according to an embodiment of the present disclosure.

In an embodiment, the preset harassment determining condition may specifically be: a harassment determining condition that is determined based on a sending user feature. In this case, a sending user feature of the UGC publication request is first parsed out, and then whether the sending user feature of the UGC publication request meets the preset harassment determining condition is determined.

Specifically, the harassment determining condition includes at least one of the following processes: determining whether a sending user of the UGC publication request has a message that is shielded within a predetermined duration; and determining whether the quantity of mentions performed by the sending user of the UGC publication request within a predetermined duration exceeds a preset mention quantity threshold.

If the sending user of the UGC publication request has a message that is shielded within the predetermined duration, it may be considered that, the sending user of the UGC publication request is probably a harassing user, and therefore, the current UGC publication request may be harassing; or if it is determined that the quantity of mentions performed by the sending user of the UGC publication request within the predetermined duration exceeds the preset mention quantity threshold, it may be considered that, the sending user of the UGC publication request is probably a harassing user, and therefore, the current UGC publication request may be harassing.

Scores may be separately set for the foregoing multiple harassment determining conditions that are determined based on the sending user feature, and then the scores for all the harassment determining conditions that are determined based on the sending user feature are added up to obtain a total score, and the total score may be compared with a threshold preset based on the sending user feature, to determine whether a harassment is constituted. If the harassment is constituted, the message content of the UGC publication request is forbidden from being sent to the mentioned object. A harassment determining condition may be added or deleted, and preferably a score of each harassment determining condition is dynamically adjustable, which can adapt to an ever changing malicious mention harassment model.

The foregoing lists in detail specific examples of harassment determining conditions that are determined based on the sending user feature, and exemplary descriptions about integrally and comprehensively determining, based on multiple harassment determining conditions that are determined based on the sending user feature, whether the harassment is constituted. A person skilled in the art may be aware that, these examples and exemplary descriptions are only expository, and are not used to limit the embodiment of the present disclosure.

Figure 5:
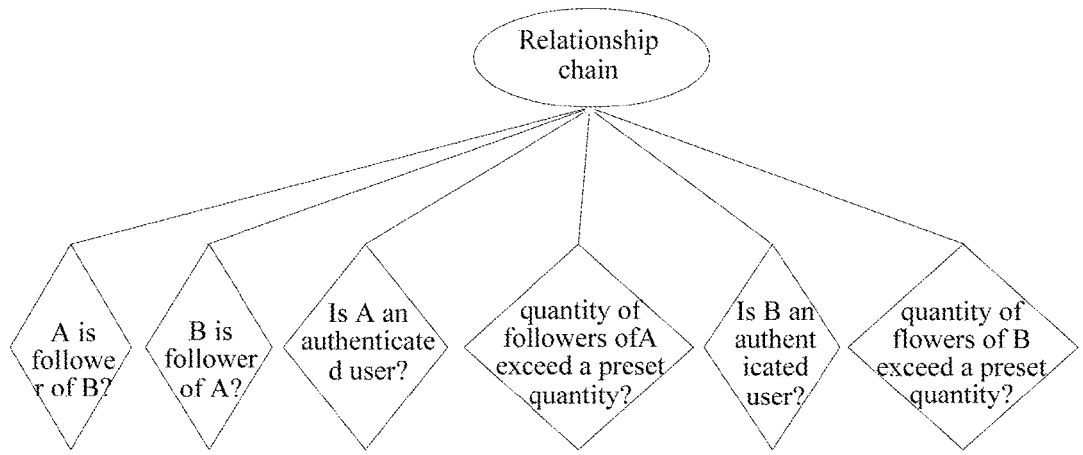
FIG. 5 is a schematic diagram of assessing relationship chain features of a sending user and a mentioned object according to an embodiment of the present disclosure.

FIG. 5 is a schematic diagram of assessing relationship chain features of a sending user and a mentioned object according to an embodiment of the present disclosure.

In an embodiment, the preset harassment determining condition is: a harassment determining condition that is determined based on a relationship chain feature of a sending user and a relationship chain feature of a mentioned object.

In this case, the relationship chain feature of the sending user and the relationship chain feature of the mentioned object of the UGC publication request are parsed out, and it is determined whether the relationship chain feature of the sending user and the relationship chain feature of the mentioned object of the UGC publication request meet the preset harassment determining condition.

Specifically, the harassment determining condition includes: determining whether the mentioned object is a follower of a sending user of the UGC publication request; determining whether the sending user of the UGC publication request is a follower of the mentioned object; determining whether the mentioned object is an authenticated user; determining whether the quantity of followers of the mentioned object exceeds a preset follower quantity threshold; determining whether the sending user of the UGC publication request is an authenticated user; or determining whether the quantity of followers of the sending user of the UGC publication request exceeds a preset follower quantity threshold.

Various factors may be comprehensively determined with respect to multiple harassment determining conditions that are determined based on the relationship chain feature of the sending user and the relationship chain feature of the mentioned object. For example, (a) if the mentioned object is a follower of the sending user of the UGC publication request, it is considered that the UGC publication request is probably not harassing;

(b) if the sending user of the UGC publication request is a follower of the mentioned object, it is considered that the UGC publication request is probably not harassing;

(c) if the mentioned object is an authenticated user, it is considered that the UGC publication request may be harassing;

(d) if the quantity of the followers of the mentioned object exceeds a preset follower quantity threshold, it is considered that the UGC publication request may be harassing;

(e) if the sending user of the UGC publication request is an authenticated user, it is considered that the UGC publication request is probably not harassing; or (f) if the quantity of the followers of the sending user of the UGC publication request exceeds the preset follower quantity threshold, it is considered that the UGC publication request is probably not harassing.

Scores may be separately set for the foregoing multiple harassment determining conditions that are determined based on the relationship chain feature of the sending user and the relationship chain feature of the mentioned object, and then the scores for all the harassment determining conditions that are determined based on the relationship chain feature of the sending user and the relationship chain feature of the mentioned object may be added up to obtain a total score, and the total score may be compared with a threshold preset based on the relationship chain feature of the sending user and the relationship chain feature of the mentioned object, to determine whether a harassment is constituted. If the harassment is constituted, the message content of the UGC publication request is forbidden from being sent to the mentioned object. A harassment determining condition may be added or deleted, and preferably a score of each harassment determining condition is dynamically adjustable, which can adapt to an ever changing malicious mention harassment model.

For example, the sending user of the UGC publication request mentions the mentioned object, and the mentioned object is a follower of the sending user of the UGC publication request; in this case, the possibility that the message is harassing is tiny. Therefore, a small enough negative score may be set for a determining result that the mentioned object is a follower of the sending user of the UGC publication request, to ensure that the finally obtained total score does not exceed a shielding threshold, i.e., the threshold preset based on the relationship chain feature of the sending user and the relationship chain feature of the mentioned object.

The foregoing lists in detail specific examples of harassment determining conditions that are determined based on the relationship chain feature of the sending user and the relationship chain feature of the mentioned object, and exemplary descriptions about integrally and comprehensively determining, based on multiple harassment determining conditions that are determined based on the relationship chain feature of the sending user and the relationship chain feature of the mentioned object, whether a harassment is constituted. A person skilled in the art may be aware that, these examples and exemplary descriptions are only expository, and are not used to limit the embodiment of the present disclosure.

In an embodiment, three major kinds of harassment determining conditions, i.e., the message content feature, the sending user feature, and the relationship chain feature of the sending user and the relationship chain feature of the mentioned object, may be comprehensively considered, to integrally determine whether a harassment is constituted. In this case, the preset harassment determining condition may specifically be a harassment determining condition that is determined weightedly based on at least two of the message content feature, the sending user feature, and the relationship chain feature of the sending user and the relationship chain feature of the mentioned object. Then, at least two of the message content feature, the sending user feature, and the relationship chain feature of the sending user and the relationship chain feature of the mentioned object of the UGC publication request are parsed out, and an overall weighted score of the at least two of the message content feature, the sending user feature, and the relationship chain feature of the sending user and the relationship chain feature of the mentioned object is calculated based on a preset weighting algorithm; and it is determined whether the overall weighted score meets a preset overall weighted score threshold. For example, the harassment determining condition may be determined weightedly based on the message content feature and the sending user feature; or the harassment determining condition may be determined weightedly based on the message content feature, and the relationship chain feature of the sending user and the relationship chain feature of the mentioned object; or the harassment determining condition may be determined weightedly based on the message content feature, and the relationship chain feature of the sending user and the relationship chain feature of the mentioned object.

Herein, a score may be separately set for each of multiple harassment determining conditions determined based on the message content feature, multiple harassment determining conditions determined based on the sending user feature, and multiple harassment determining conditions determined based on the relationship chain feature of the sending user and the relationship chain feature of the mentioned object, and then the scores for all the harassment determining conditions that are determined based on these features may be added up to obtain a total score, and the total score may be compared with a preset overall threshold, to determine whether a harassment is constituted. If the harassment is constituted, the message content of the UGC publication request is forbidden from being sent to the mentioned object. A harassment determining condition may be added or deleted, and preferably a score of each harassment determining condition is dynamically adjustable, which can adapt to an ever changing malicious mention harassment model.

Based on the foregoing detailed analysis, an apparatus for shielding harassment by a mention in a UGC is further provided according to an embodiment of the present disclosure.

Figure 6:
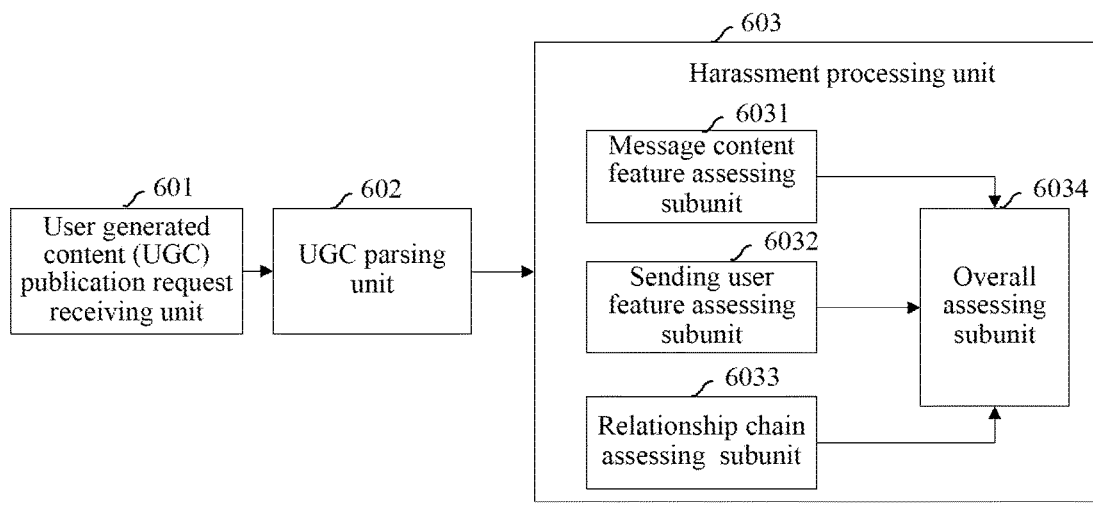
FIG. 6 is a structural diagram of an apparatus for shielding harassment by a mention in a UGC according to an embodiment of the present disclosure.

FIG. 6 is a structural diagram of an apparatus for shielding harassment by a mention in a UGC according to an embodiment of the present disclosure.

As shown in FIG. 6, the apparatus includes a UGC publication request receiving unit 601, a UGC parsing unit 602, and a harassment processing unit 603, where the UGC publication request receiving unit 601 is used to receive a UGC publication request;

the UGC parsing unit 602 is used to parse the UGC publication request, to determine whether a mentioned object is included; and the harassment processing unit 603 is used to, determine whether the UGC publication request meets a preset harassment determining condition if the UGC parsing unit determines that the mentioned object is included, and forbid sending a message content of the UGC publication request to the mentioned object if the preset harassment determining condition is met.

In an embodiment, the preset harassment determining condition is: a harassment determining condition that is determined based on a message content feature; and the harassment processing unit 603 is used to parse out a message content feature of the UGC publication request, and determine whether the message content feature of the UGC publication request meets the preset harassment determining condition.

Specifically, the harassment determining condition includes at least one of the following: determining whether the message content of the UGC publication request includes a URL; determining whether the message content of the UGC publication request relates to a topic; determining whether the message content of the UGC publication request is a repost or a comment; determining whether the message content of the UGC publication request is original; determining whether the message content of the UGC publication request includes a preset blacklisted word; and determining whether the message content of the UGC publication request is published in a third-party application.

In an embodiment, the preset harassment determining condition is: a harassment determining condition that is determined based on a sending user feature; and the harassment processing unit 603 is used to parse out a sending user feature of the UGC publication request, and determine whether the sending user feature of the UGC publication request meets the preset harassment determining condition.

Specifically, the harassment determining condition includes at least one of the following: determining whether a sending user of the UGC publication request has a message that is shielded within a predetermined duration; and determining whether the quantity of mentions performed by the sending user of the UGC publication request within a predetermined duration exceeds a preset mention quantity threshold.

In an embodiment, the preset harassment determining condition is: a harassment determining condition that is determined based on a relationship chain feature of a sending user and a relationship chain feature of a mentioned object; and the harassment processing unit 603 is used to parse out a relationship chain feature of a sending user and a relationship chain feature of a mentioned object of the UGC publication request, and determine whether the relationship chain feature of the sending user and the relationship chain feature of the mentioned object of the UGC publication request meet the preset harassment determining condition.

Specifically, the harassment determining condition includes at least one of the following:

determining whether the mentioned object is a follower of a sending user of the UGC publication request; determining whether the sending user of the UGC publication request is a follower of the mentioned object; determining whether the mentioned object is an authenticated user; determining whether the quantity of followers of the mentioned object exceeds a preset follower quantity threshold; determining whether the sending user of the UGC publication request is an authenticated user; and determining whether the quantity of followers of the sending user of the UGC publication request exceeds a preset follower quantity threshold.

More preferably, the preset harassment determining condition includes: a harassment determining condition that is determined weightedly based on at least two of the message content feature, the sending user feature, and the relationship chain feature of the sending user and the relationship chain feature of the mentioned object; and in this case, the harassment processing unit 603 includes a message content feature assessing subunit 6031, a sending user feature assessing subunit 6032, a relationship chain assessing subunit 6033, and an overall assessing subunit 6034, where the message content feature assessing subunit 6031 is used to calculate a value of the message content feature of the UGC publication request;

the sending user feature assessing subunit 6032 is used to calculate a value of the sending user feature of the UGC publication request;

the relationship chain assessing subunit 6033 is used to calculate a value of the relationship chain feature of the sending user and the relationship chain feature of the mentioned object; and the overall assessing subunit 6034 is used to, perform a weighting calculation on at least two of the value of the relationship chain feature of the sending user and the relationship chain feature of the mentioned object, the value of the message content feature, and the value of the sending user feature, to obtain an overall weighted value; determine whether the overall weighted value meets a preset overall weighted value threshold; and determine that the message constitutes a harassment to the mentioned user if the overall weighted value exceeds a preset overall weighted value threshold.

Foe any one of the message content feature, the sending user feature, and the relationship chain feature of the sending user and the relationship chain feature of the mentioned object which is not involved in the harassment determining condition, a corresponding assessing subunit may set the value of the corresponding feature(s) as 0.

If the overall assessing subunit 6034 determines that the UGC publication request is harassing, the message content of the UGC publication request is forbidden from being sent to the mentioned object.

The apparatus shown in FIG. 6 may be integrated into various hardware entities of a communications network. For example, the apparatus for shielding harassment by a mention in a UGC may be integrated into a device such as a feature phone, a smart phone, a palmtop computer, a PC, a tablet computer, or a PDA.

Figure 7:
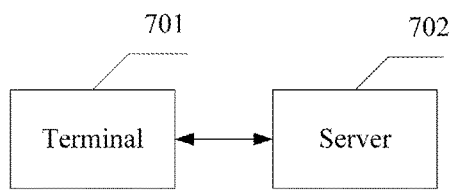
FIG. 7 is a structural diagram of a system for shielding harassment by a mention in a UGC according to an embodiment of the present disclosure.

FIG. 7 is a structural diagram of a system for shielding harassment by a mention in a UGC according to an embodiment of the present disclosure.

As shown in FIG. 7, the system includes a terminal 701 and a server 702, and there is a communication connection between the terminal 701 and the server 702, where the terminal 701 is used to generate a UGC, and send a UGC publication request to the server 702; and the server 702 is used to, parse the UGC publication request to determine whether a mentioned object is included, determine whether the UGC publication request meets a preset harassment determining condition if it is determined that the mentioned object is included, and forbid sending a message content of the UGC publication request to the mentioned object if the preset harassment determining condition is met.

In an embodiment, the preset harassment determining condition is: a harassment determining condition that is determined based on a message content feature; and the server 702 is used to parse out a message content feature of the UGC publication request, and determine whether the message content feature of the UGC publication request meets the preset harassment determining condition.

In an embodiment, the preset harassment determining condition is: a harassment determining condition that is determined based on a sending user feature; and the server 702 is used to parse out a sending user feature of the UGC publication request, and determine whether the sending user feature of the UGC publication request meets the preset harassment determining condition.

In an embodiment, the preset harassment determining condition is: a harassment determining condition that is determined based on a relationship chain feature of a sending user and a relationship chain feature of a mentioned object; and the server 702 is used to parse out a relationship chain feature of a sending user and a relationship chain feature of a mentioned object of the UGC publication request, and determine whether the relationship chain feature of the sending user and the relationship chain feature of the mentioned object of the UGC publication request meet the preset harassment determining condition.

In an embodiment, the preset harassment determining condition includes: a harassment determining condition that is determined weightedly based on at least two of the message content feature, the sending user feature, and the relationship chain feature of the sending user and the relationship chain feature of the mentioned object; and the server 702 is used to, parse out at least two of the message content feature, the sending user feature, and the relationship chain feature of the sending user and the relationship chain feature of the mentioned object of the UGC publication request; calculate an overall weighted score of the at least two of the message content feature, the sending user feature, and the relationship chain feature of the sending user and the relationship chain feature of the mentioned object of the UGC publication request based on a preset weighting algorithm; and determine whether the overall weighted score meets a preset overall weighted score threshold.

It should be noted that, in the foregoing flow charts and structural diagrams, not all steps and modules are necessary, and some steps or modules may be deleted according to an actual requirement. An order for performing the steps is not fixed, and may be adjusted according to requirements. Division of the modules is only functional division for convenience of describing. In an actual implementation, one module may be implemented by multiple modules, and functions of multiple modules may also be implemented by one module. These modules may be located in a same device, or may be located in different devices.

Hardware modules in the embodiments may be implemented in a mechanical form or an electronic form. For example, a hardware module may include a dedicated permanent circuit or logical component (for example, a dedicated processor such as an FPGA or an ASIC), to complete a specific operation. Alternatively, the hardware module may include a programmable logical component or circuit (for example, including a general processor or another programmable processor) that is temporarily configured by using software, to perform a specific operation. As for whether the hardware module is implemented specifically in a mechanical form, or by using a dedicated permanent circuit, or by using a circuit temporarily configured (for example, configured by using software), it may be determined according to considerations of costs and time.

The present disclosure further provides a machine-readable storage medium, which stores instructions that are used to make a machine execute the method described in the specification. Specifically, a system or an apparatus that is equipped with the storage medium may be provided, where software program code for implementing the function in any one of the foregoing embodiments is stored in the storage medium, and a computer (or a CPU or an MPU) of the system or apparatus is made to read and execute the program code stored in the storage medium. In addition, instructions based on program code may further be used to instruct an operating system and the like running on the computer to complete some or all actual operations. The program code read from the storage medium may further be written to a memory disposed in an expansion card inserted into the computer or written to a memory disposed in an extended unit connected to the computer, and then the instructions based on program code make a CPU installed on the expansion card or the extended unit perform some or all actual operations, thereby implementing functions in any of the foregoing embodiments.

Examples of the storage medium for providing the program code include a floppy disk, a hard disk, a magneto-optical disk, an optical disc (for example, a CD-ROM, a CD-R, a CD-RW, a DVD-ROM, a DVD-RAM, a DVD-RW, or a DVD+RW), a magnetic tape, a non-volatile storage card, and a ROM. Optionally, the program code may be downloaded from a server computer through a communications network.

In summary, in the embodiments of the present disclosure, a UGC publication request is received; the UGC publication request is parsed, to determine whether a mentioned object is included; whether the UGC publication request meets a preset harassment determining condition is further determined if it is determined that the mentioned object is included; and if the preset harassment determining condition is met, a message content of the UGC publication request is forbidden from being sent to the mentioned object. Therefore, by applying the embodiments of the present disclosure, an intelligent shielding policy for harassment by a mention in a UGC is implemented, and intelligent shielding can be performed on the harassment by a mention before a microblog is published. The embodiments of the present disclosure overcome a defect of processing after occurrence in the existing technology, and implement beforehand processing for the harassment by a mention in a UGC, thereby improving real-time performance of processing, and improving the efficiency of processing the harassment by a mention in a UGC.

Moreover, the embodiments of the present disclosure implement automatic shielding of the harassment by a mention in a UGC, overcome a defect of manual examination in the existing technology, and reduce operation costs. In the embodiments of the present disclosure, features of three large dimensions, i.e., a message body content, a user feature, and a relationship chain are synthesized, increasing the accuracy of a comprehensive score. Each score item can be adjusted, which can adapt to an ever changing malicious mention harassment model, thereby improving the overall message quality of microblog, and improving the efficiency of processing the harassment by a mention in a UGC.

The foregoing descriptions are merely preferred embodiments of the present invention, but are not used to limit the protection scope of the present disclosure. Any modification, equivalent replacement, or improvement made without departing from the spirit and principle of the present invention should fall within the protection scope of the present disclosure.

What is claimed is:

1. A method which is executed by a server, for shielding harassment by a mention in a user generated content (UGC), wherein the server comprises a processor executing a program stored in a non-transitory computer-readable storage medium, the method comprising:
    receiving by the server, a UGC publication request; and
    parsing by the server, the UGC publication request to determine whether a mentioned user account is included,
    determining by the server, whether the UGC publication request meets a preset harassment determining condition if it is determined by the server that the mentioned user account is comprised, and forbidding by the server, sending of a message content of the UGC publication request to the mentioned user account if the server determines that the preset harassment determining condition is met,
    wherein the preset harassment determining condition is a harassment determining condition determined weightedly by the server based on at least two of a message content feature, a sending user feature, and a relationship chain feature of a sending user and a relationship chain feature of a mentioned user account,
    wherein in a case that the preset harassment determining condition is a harassment determining condition which is determined by the server based on a sending user feature, the server's determining of whether the UGC publication request meets a preset harassment determining condition comprises:
    parsing out by the server, a sending user feature of the UGC publication request, and determining by the server, whether the sending user feature of the UGC publication request meets the preset harassment determining condition, wherein the harassment determining condition comprises determining by the server, whether the quantity of mentions performed by the sending user of the UGC publication request within a predetermined duration exceeds a preset mention quantity threshold.

2. The method for shielding harassment by the mention in the UGC according to claim 1, wherein in a case that the preset harassment determining condition is a harassment determining condition determined based on a message content feature, the determining whether the UGC publication request meets a preset harassment determining condition comprises:
    parsing out a message content feature of the UGC publication request, and determining whether the message content feature of the UGC publication request meets the preset harassment determining condition.

3. The method for shielding harassment by the mention in the UGC according to claim 2, wherein in a case that the preset harassment determining condition is a harassment determining condition determined based on the message content feature, the harassment determining condition comprises at least the following:
    determining whether the message content of the UGC publication request comprises a uniform resource locator (URL);
    determining whether the message content of the UGC publication request relates to a topic;
    determining whether the message content of the UGC publication request is a repost or a comment;
    determining whether the message content of the UGC publication request is original;
    determining whether the message content of the UGC publication request comprises a preset blacklisted word; and
    determining whether the message content of the UGC publication request is published in a third-party application.

4. The method for shielding harassment by the mention in the UGC according to claim 1, wherein in a case that the preset harassment determining condition is a harassment determining condition determined based on a relationship chain feature of a sending user and a relationship chain feature of a mentioned user account, the determining whether the UGC publication request meets a preset harassment determining condition comprises:

parsing out a relationship chain feature of a sending user and a relationship chain feature of a mentioned user account of the UGC publication request, and determining whether the relationship chain feature of the sending user and the relationship chain feature of the mentioned user account of the UGC publication request meet the preset harassment determining condition.

5. The method for shielding harassment by the mention in the UGC according to claim 4, wherein in a case that the preset harassment determining condition is a harassment determining condition determined based on the relationship chain feature of a sending user and a relationship chain feature of a mentioned user account, the harassment determining condition comprises at least the following:
  determining whether the mentioned user account is a follower of the sending user of the UGC publication request;
  determining whether the sending user of the UGC publication request is a follower of the mentioned user account;
  determining whether the mentioned user account is an authenticated user;
  determining whether the quantity of followers of the mentioned user account exceeds a preset follower quantity threshold;
  determining whether the sending user of the UGC publication request is an authenticated user; and
  determining whether the quantity of followers of the sending user of the UGC publication request exceeds a preset follower quantity threshold.

6. The method for shielding harassment by the mention in the UGC according to claim 1,
  the determining whether the UGC publication request meets a preset harassment determining condition comprises:
  parsing out at least one of the message content feature, the sending user feature, and the relationship chain feature of the sending user and the relationship chain feature of the mentioned user account of the UGC publication request, and calculating an overall weighted value of the at least one of the message content feature, the sending user feature, and the relationship chain feature of the sending user and the relationship chain feature of the mentioned user account of the UGC publication request based on a preset weighting algorithm; and
  determining whether the overall weighted value meets a preset overall weighted value threshold.

7. An apparatus for shielding harassment by a mention in a user generated content (UGC), the apparatus comprising one or more processors and a memory having a plurality of processor-executable instruction modules stored therein, wherein the instruction modules comprise a UGC publication request receiving unit, a UGC parsing unit, and a harassment processing unit, wherein
  the UGC publication request receiving unit is configured to receive a UGC publication request;
  the UGC parsing unit is configured to parse the UGC publication request, to determine whether a mentioned user account is included; and
  the harassment processing unit is configured to, determine whether the UGC publication request meets a preset harassment determining condition if the UGC parsing unit determines that the mentioned user account is comprised, and forbid sending a message content of the UGC publication request to the mentioned user account if the preset harassment determining condition is met, wherein the preset harassment determining condition is a harassment determining condition determined weightedly by the apparatus is based on at least two of a message content feature, a sending user feature, and a relationship chain feature of a sending user and a relationship chain feature of a mentioned user account,
  wherein in a case that the preset harassment determining condition is a harassment determining condition determined based on a sending user feature, the harassment processing unit is configured to parse out a sending user feature of the UGC publication request, and determine whether the sending user feature of the UGC publication request meets the preset harassment determining condition, wherein the harassment determining condition comprises determining whether the quantity of mentions performed by the sending user of the UGC publication request within a predetermined duration exceeds a preset mention quantity threshold.

8. The apparatus for shielding harassment by the mention in the UGC according to claim 7, wherein in a case that the preset harassment determining condition is a harassment determining condition determined based on a message content feature, the harassment processing unit is configured to parse out a message content feature of the UGC publication request, and determine whether the message content feature of the UGC publication request meets the preset harassment determining condition.

9. The apparatus for shielding harassment by the mention in the UGC according to claim 8, wherein in a case that the preset harassment determining condition is a harassment determining condition determined based on a message content feature, the harassment determining condition comprises at least the following:
  determining whether the message content of the UGC publication request comprises a uniform resource locator (URL);
  determining whether the message content of the UGC publication request relates to a topic;
  determining whether the message content of the UGC publication request is a repost or a comment;
  determining whether the message content of the UGC publication request is original;
  determining whether the message content of the UGC publication request comprises a preset blacklisted word; and
  determining whether the message content of the UGC publication request is published in a third-party application.

10. The apparatus for shielding harassment by the mention in the UGC according to claim 7, wherein in a case that the preset harassment determining condition is a harassment determining condition determined based on a relationship chain feature of a sending user and a relationship chain feature of a mentioned user account, the harassment processing unit is configured to parse out a relationship chain feature of a sending user and a relationship chain feature of a mentioned user account of the UGC publication request, and determine whether the relationship chain feature of the sending user and the relationship chain feature of the mentioned user account of the UGC publication request meet the preset harassment determining condition.

11. The apparatus for shielding harassment by the mention in the UGC according to claim 10, wherein in a case that the preset harassment determining condition is a harassment determining condition determined based on a relationship chain feature of a sending user and a relationship chain feature of a mentioned user account, the harassment determining condition comprises at least the following:
  determining whether the mentioned user account is a follower of the sending user of the UGC publication request;
  determining whether the sending user of the UGC publication request is a follower of the mentioned user account;
  determining whether the mentioned user account is an authenticated user;
  determining whether the quantity of followers of the mentioned user account exceeds a preset follower quantity threshold;
  determining whether the sending user of the UGC publication request is an authenticated user; or
  determining whether the quantity of followers of the sending user of the UGC publication request exceeds a preset follower quantity threshold.

12. The apparatus for shielding harassment by the mention in the UGC according to claim 7, wherein the harassment processing unit comprises a message content feature assessing subunit, a sending user feature assessing subunit, a relationship chain assessing subunit, and an overall assessing subunit, wherein
  the message content feature assessing subunit is configured to calculate a value of the message content feature of the UGC publication request;
  the sending user feature assessing subunit is configured to calculate a value of the sending user feature of the UGC publication request;
  the relationship chain assessing subunit is configured to calculate a value of the relationship chain features of the sending user and the mentioned user account; and
  the overall assessing subunit is configured to perform a weighting calculation on at least one of the value of the relationship chain features of the sending user and the mentioned user account, the value of the message content feature, and the value of the sending user feature, to obtain an overall weighted value, and determine whether the overall weighted value meets a preset overall weighted value threshold.

13. A system for shielding harassment by a mention in a user generated content (UGC), comprising a terminal and a server, wherein
  the terminal is configured to generate the UGC, and send a UGC publication request to the server; and
  the server is configured to parse the UGC publication request to determine whether a mentioned user account is included, determine whether the UGC publication request meets a preset harassment determining condition if it is determined that the mentioned user account is comprised, and forbid sending a message content of the UGC publication request to the mentioned user account if the preset harassment determining condition is met,
  wherein the preset harassment determining condition is a harassment determining condition determined weightedly by the server is based on at least two of a message content feature, a sending user feature, and a relationship chain feature of a sending user and a relationship chain feature of a mentioned user account,
  wherein in a case that the preset harassment determining condition is a harassment determining condition determined based on a sending user feature, the server is configured to parse out a sending user feature of the UGC publication request, and determine whether the sending user feature of the UGC publication request meets the preset harassment determining condition, wherein the harassment determining condition comprises determining whether the quantity of mentions performed by the sending user of the UGC publication request within a predetermined duration exceeds a preset mention quantity threshold.

14. The system for shielding harassment by the mention in the UGC according to claim 13, wherein the preset harassment determining condition is a harassment determining condition determined based on a message content feature; and
  the server is configured to parse out a message content feature of the UGC publication request, and determine whether the message content feature of the UGC publication request meets the preset harassment determining condition.

15. The system for shielding harassment by the mention in the UGC according to claim 13, wherein the preset harassment determining condition is a harassment determining condition determined based on a relationship chain feature of a sending user and a relationship chain feature of a mentioned user account; and
  the server is configured to parse out a relationship chain feature of a sending user and a relationship chain feature of a mentioned user account of the UGC publication request, and determine whether the relationship chain feature of the sending user and the relationship chain feature of the mentioned user account of the UGC publication request meet the preset harassment determining condition.

* * * * *